US012579546B2

(12) United States Patent
Merz et al.

(10) Patent No.: US 12,579,546 B2
(45) Date of Patent: Mar. 17, 2026

(54) COMPROMISED DATA SOURCE DETECTOR AND METHOD

(71) Applicant: MASTERCARD INTERNATIONAL INCORPORATED, Purchase, NY (US)

(72) Inventors: Christopher John Merz, Wildwood, MO (US); Joshua A. Allbright, Valley Park, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/751,461

(22) Filed: May 23, 2022

(65) Prior Publication Data

US 2022/0284436 A1 Sep. 8, 2022

Related U.S. Application Data

(63) Continuation of application No. 15/794,899, filed on Oct. 26, 2017, now abandoned.

(51) Int. Cl.
*G06Q 20/40* (2012.01)
*G06Q 20/18* (2012.01)
(Continued)

(52) U.S. Cl.
CPC ......... *G06Q 20/4016* (2013.01); *G06Q 20/18* (2013.01); *G06Q 20/202* (2013.01);
(Continued)

(58) Field of Classification Search
CPC .... G06Q 20/4016; G06Q 20/40; G06Q 20/04; G06Q 20/10; G06Q 30/06; G06Q 40/00
(Continued)

(56) References Cited

U.S. PATENT DOCUMENTS 7,580,891 B2 * 8/2009 Klebanoff ............ G06Q 20/403
705/38
7,814,008 B2 * 10/2010 Choudhuri ............. G06Q 40/08
705/37
(Continued)

FOREIGN PATENT DOCUMENTS

CN 111279374 A * 6/2020 ............. G06Q 20/18
EP 2420966 A1 2/2012
(Continued)

OTHER PUBLICATIONS

CN_111279374_A Eng Translation (Year: 2020).*
(Continued)

*Primary Examiner* — Hani M Kazimi
(74) *Attorney, Agent, or Firm* — Armstrong Teasdale LLP

(57) ABSTRACT

A compromise detection computing device is configured to receive transaction data associated with a set of transactions performed at a plurality of merchants, each transaction conducted using a payment device, identify a first merchant, and generate a list of every payment device that was used to conduct a transaction at the first merchant. The compromise detection computing device is further configured to monitor subsequent transaction activity associated with each payment device on the list, and generate a fraud proxy score for each payment device based upon the activity. The compromise detection computing device is further configured to access fraud report records associated with any payment device on the list, generate an implication score for the first merchant based upon the fraud proxy score and the fraud report records, and, when the first implication score meets a first criteria, automatically transmit an alert message to a receiving party.

20 Claims, 5 Drawing Sheets

500

502
RECEIVE TRANSACTION DATA ASSOCIATED WITH A SET OF TRANSACTIONS PERFORMED AT A PLURALITY OF MERCHANTS, EACH TRANSACTION CONDUCTED USING A PAYMENT DEVICE

504
IDENTIFY A FIRST MERCHANT OF THE PLURALITY OF MERCHANTS

506
GENERATE A LIST OF EVERY PAYMENT DEVICE THAT WAS USED TO CONDUCT ONE OR MORE TRANSACTIONS AT THE FIRST MERCHANT

508
MONITOR SUBSEQUENT TRANSACTION ACTIVITY ASSOCIATED WITH EACH PAYMENT DEVICE

510
GENERATE A FRAUD SCORE FOR EACH PAYMENT DEVICE BASED UPON THE SUBSEQUENT TRANSACTION ACTIVITY

512
ACCESS ONE OR MORE REPORTED FRAUD RECORDS ASSOCIATED WITH ANY PAYMENT DEVICE ON THE GENERATED LIST

512
GENERATE A FIRST IMPLICATION SCORE FOR THE FIRST MERCHANT

516
WHEN THE FIRST IMPLICATION SCORE MEETS A FIRST CRITERIA INDICATING POTENTIAL COMPROMISE OF THE FIRST MERCHANT, AUTOMATICALLY TRANSMIT AN ALERT MESSAGE TO AT LEAST ONE RECEIVING PARTY

(51) Int. Cl.

| | |
|---|---|
| *G06Q 20/20* | (2012.01) |
| *G06Q 20/38* | (2012.01) |
| *G06Q 40/00* | (2023.01) |
| *G06Q 40/03* | (2023.01) |

(52) U.S. Cl.
CPC ......... *G06Q 20/389* (2013.01); *G06Q 20/401* (2013.01); *G06Q 20/405* (2013.01); *G06Q 40/00* (2013.01); *G06Q 40/03* (2023.01)

(58) Field of Classification Search
USPC .............................. 705/38–44, 35, 18, 26.35
See application file for complete search history.

(56) References Cited

U.S. PATENT DOCUMENTS

| | | | |
|---|---|---|---|
| 8,266,059 B2 | 9/2012 | Horvath et al. | |
| 8,423,467 B1 | 4/2013 | Johansson et al. | |
| 8,489,476 B1 * | 7/2013 | Lester ............... | G06Q 30/0609 705/35 |
| 8,600,872 B1 | 12/2013 | Yan | |
| 8,606,700 B2 | 12/2013 | Carlson et al. | |
| 8,612,340 B1 | 12/2013 | Yan | |
| 8,620,801 B2 * | 12/2013 | Choudhuri ............. | G06Q 40/02 705/40 |
| 8,694,429 B1 * | 4/2014 | Ballaro .............. | G06Q 30/0635 705/40 |
| 8,706,641 B2 | 4/2014 | Bruesewitz et al. | |
| 8,744,958 B2 | 6/2014 | Carlson et al. | |
| 9,230,280 B1 | 1/2016 | Maag et al. | |
| 9,256,810 B2 | 2/2016 | Wu et al. | |
| 9,256,870 B1 | 2/2016 | Howe | |
| 9,331,994 B2 * | 5/2016 | Grigg ............... | G06F 16/24578 |
| 9,392,008 B1 | 7/2016 | Michel et al. | |
| 9,412,108 B2 * | 8/2016 | Wang ..................... | G06Q 20/34 |
| 9,477,960 B2 * | 10/2016 | Grigg ................... | G06Q 20/386 |
| 9,483,766 B2 * | 11/2016 | Grigg ............... | G06F 16/24578 |
| 9,547,864 B2 | 1/2017 | Howe | |
| 9,661,012 B2 | 5/2017 | Michel et al. | |
| 9,721,080 B2 * | 8/2017 | Moran ..................... | G06F 21/32 |
| 10,380,333 B1 * | 8/2019 | Moran ..................... | G06F 21/32 |
| 10,395,243 B1 | 8/2019 | Johansson et al. | |
| 10,586,235 B2 | 3/2020 | Wang et al. | |
| 2003/0217094 A1 * | 11/2003 | Andrews ............... | G06Q 10/10 709/201 |
| 2004/0034604 A1 * | 2/2004 | Klebanoff ........... | G06Q 20/367 705/65 |
| 2004/0162773 A1 * | 8/2004 | Del Rey ................ | G06Q 40/02 705/36 R |
| 2005/0055373 A1 | 3/2005 | Forman | |
| 2007/0094067 A1 | 4/2007 | Kumar et al. | |
| 2007/0185782 A1 * | 8/2007 | Shooks .................. | G06Q 20/00 705/26.35 |
| 2009/0132347 A1 | 5/2009 | Anderson et al. | |
| 2009/0132404 A1 | 5/2009 | King et al. | |
| 2009/0276269 A1 * | 11/2009 | Yee ..................... | G06Q 10/063 705/317 |
| 2009/0307049 A1 | 12/2009 | Elliott, Jr. et al. | |
| 2010/0228580 A1 | 9/2010 | Zoldi et al. | |
| 2010/0280882 A1 | 11/2010 | Faith et al. | |
| 2011/0078034 A1 | 3/2011 | Hayhow | |
| 2012/0084207 A1 | 4/2012 | Horvath et al. | |
| 2012/0239557 A1 | 9/2012 | Weinflash et al. | |
| 2012/0296824 A1 * | 11/2012 | Rosano ............... | G06Q 20/102 705/44 |
| 2013/0036036 A1 | 2/2013 | Zoldi | |
| 2013/0159077 A1 * | 6/2013 | Stringfellow .......... | G06Q 30/02 705/14.16 |
| 2013/0231976 A1 | 9/2013 | Tavares et al. | |
| 2013/0297473 A1 | 11/2013 | Wolfe | |
| 2014/0032409 A1 * | 1/2014 | Rosano ............... | G06Q 20/401 705/44 |

| | | | |
|---|---|---|---|
| 2014/0249934 A1 * | 9/2014 | Subramanian et al. | |
| 2014/0258099 A1 * | 9/2014 | Rosano ................ | G06Q 20/409 705/39 |
| 2014/0279185 A1 * | 9/2014 | Merz ................... | G06Q 30/0282 705/26.7 |
| 2014/0279331 A1 | 9/2014 | Gimby et al. | |
| 2014/0324522 A1 | 10/2014 | Wilkins et al. | |
| 2014/0337215 A1 * | 11/2014 | Howe .................... | G06Q 20/34 705/44 |
| 2015/0012430 A1 * | 1/2015 | Chisholm .............. | G06Q 20/34 705/44 |
| 2015/0073981 A1 | 3/2015 | Adjaoute | |
| 2015/0127547 A1 | 5/2015 | Powell et al. | |
| 2015/0220999 A1 * | 8/2015 | Thornton ............ | H04M 15/805 705/14.66 |
| 2015/0339667 A1 | 11/2015 | Dua | |
| 2015/0339673 A1 | 11/2015 | Adjaoute | |
| 2015/0348023 A1 | 12/2015 | Fisher et al. | |
| 2015/0371207 A1 * | 12/2015 | Cummins .............. | G06Q 30/06 705/39 |
| 2016/0125317 A1 * | 5/2016 | Benjamin .............. | G06Q 30/02 706/12 |
| 2016/0125405 A1 * | 5/2016 | Alterman ............... | G06Q 20/40 705/44 |
| 2016/0155124 A1 | 6/2016 | Howe | |
| 2016/0162759 A1 * | 6/2016 | Yun .................... | G06Q 20/4016 382/218 |
| 2016/0171498 A1 * | 6/2016 | Wang .................. | G06Q 20/405 705/44 |
| 2016/0180333 A1 | 6/2016 | Leyva | |
| 2016/0196615 A1 | 7/2016 | Yen et al. | |
| 2016/0217470 A1 | 7/2016 | Gerard et al. | |
| 2016/0335641 A1 | 11/2016 | White et al. | |
| 2016/0352766 A1 | 12/2016 | Flacher et al. | |
| 2016/0364727 A1 * | 12/2016 | DeLawter ........... | G06Q 20/389 |
| 2016/0364728 A1 | 12/2016 | DeLawter et al. | |
| 2017/0048272 A1 * | 2/2017 | Yamamura .............. | H04L 63/10 |
| 2017/0053294 A1 | 2/2017 | Yang et al. | |
| 2017/0116585 A1 * | 4/2017 | Rosano .................. | G06Q 40/12 |
| 2017/0140262 A1 | 5/2017 | Wilson et al. | |
| 2017/0169500 A1 * | 6/2017 | Merz .................. | G06Q 30/0631 |
| 2017/0193515 A1 | 7/2017 | Sharan et al. | |
| 2017/0293906 A1 | 10/2017 | Komarov | |
| 2018/0053188 A1 | 2/2018 | Zoldi et al. | |
| 2018/0114203 A1 * | 4/2018 | Senci .................. | G06Q 20/401 |
| 2018/0218369 A1 | 8/2018 | Xiao et al. | |
| 2019/0073647 A1 | 3/2019 | Zoldi et al. | |
| 2019/0130403 A1 | 5/2019 | Merz et al. | |
| 2019/0188722 A1 * | 6/2019 | Allbright .............. | G06F 16/951 |
| 2019/0220864 A1 | 7/2019 | Avegliano et al. | |
| 2019/0279309 A1 | 9/2019 | Gupta et al. | |

FOREIGN PATENT DOCUMENTS

| | | | |
|---|---|---|---|
| WO | 2001077959 A1 | 10/2001 | |
| WO | 2002025495 A1 | 3/2002 | |
| WO | 2004070293 A1 | 8/2004 | |
| WO | 2009067346 A2 | 5/2009 | |
| WO | 2011025689 A1 | 3/2011 | |
| WO | 2012135115 A2 | 10/2012 | |
| WO | 2017031039 A1 | 2/2017 | |
| WO | 2017132111 A1 | 8/2017 | |

OTHER PUBLICATIONS

Baboo et al. "Analysis of Spending Pattern on Credit Card Detection," IOSR Journal of Computer Engineering, Mar.-Apr. 2015 (Year: 2015).

Wikipedia, "Collaborative Filtering," https://web.archive.org (Year: 2017).

* cited by examiner

500

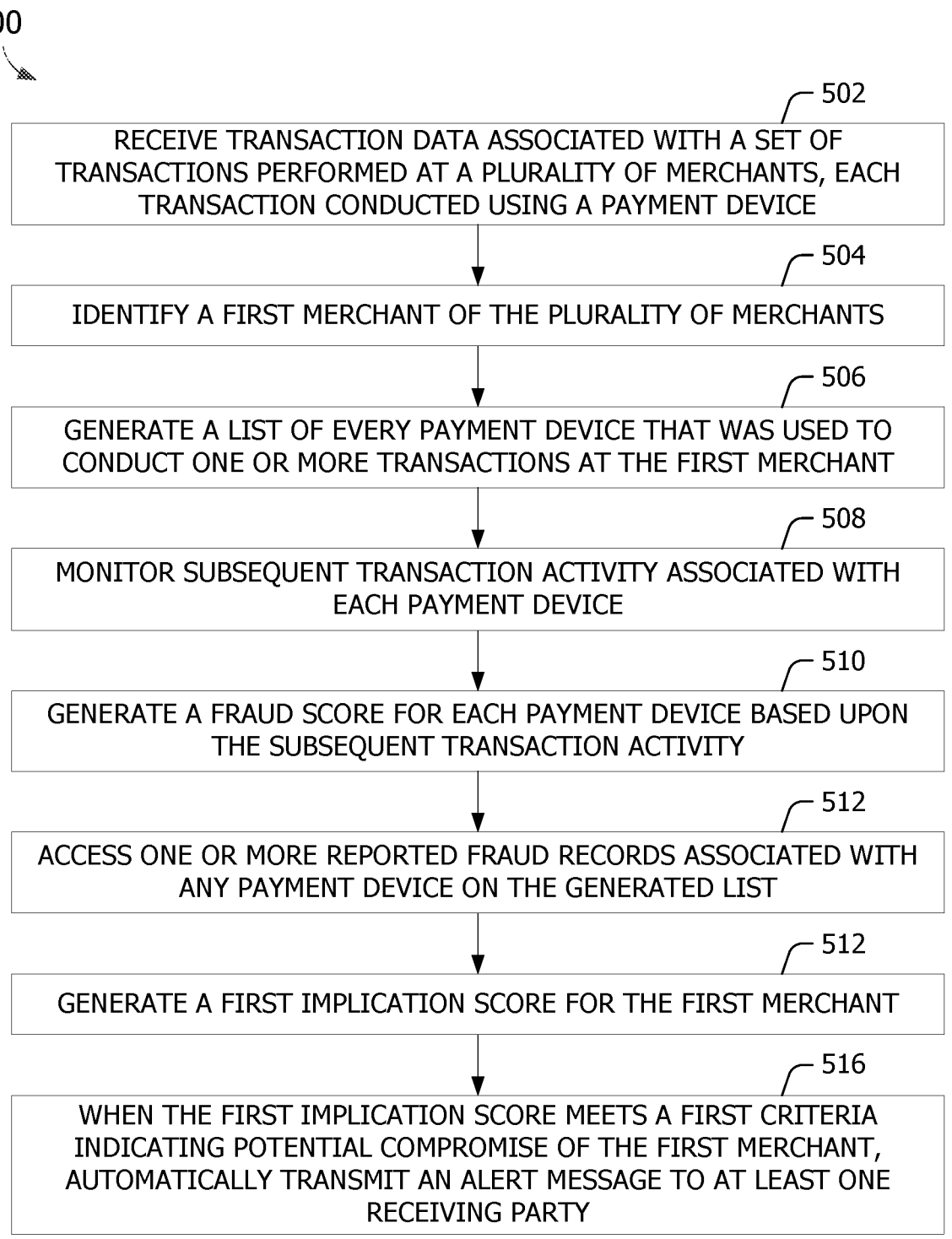

502

RECEIVE TRANSACTION DATA ASSOCIATED WITH A SET OF TRANSACTIONS PERFORMED AT A PLURALITY OF MERCHANTS, EACH TRANSACTION CONDUCTED USING A PAYMENT DEVICE

504

IDENTIFY A FIRST MERCHANT OF THE PLURALITY OF MERCHANTS

506

GENERATE A LIST OF EVERY PAYMENT DEVICE THAT WAS USED TO CONDUCT ONE OR MORE TRANSACTIONS AT THE FIRST MERCHANT

508

MONITOR SUBSEQUENT TRANSACTION ACTIVITY ASSOCIATED WITH EACH PAYMENT DEVICE

510

GENERATE A FRAUD SCORE FOR EACH PAYMENT DEVICE BASED UPON THE SUBSEQUENT TRANSACTION ACTIVITY

512

ACCESS ONE OR MORE REPORTED FRAUD RECORDS ASSOCIATED WITH ANY PAYMENT DEVICE ON THE GENERATED LIST

512

GENERATE A FIRST IMPLICATION SCORE FOR THE FIRST MERCHANT

516

WHEN THE FIRST IMPLICATION SCORE MEETS A FIRST CRITERIA INDICATING POTENTIAL COMPROMISE OF THE FIRST MERCHANT, AUTOMATICALLY TRANSMIT AN ALERT MESSAGE TO AT LEAST ONE RECEIVING PARTY

FIG. 5

COMPROMISED DATA SOURCE DETECTOR AND METHOD

CROSS REFERENCE TO RELATED APPLICATIONS

This application is a continuation of U.S. patent application Ser. No. 15/794,899, filed Oct. 26, 2017, and is related to U.S. patent application Ser. No. 15/794,768, filed Oct. 26, 2017, entitled "SYSTEMS AND METHODS FOR DETECTING OUT-OF-PATTERN TRANSACTIONS", the disclosures of both are hereby incorporated herein by reference in their entireties.

BACKGROUND

This disclosure relates to detecting compromised data sources, and more particularly, to systems and methods for detecting, identifying, and remediating compromised data sources by analyzing data messages sent between different parties and devices identified in those data messages over time.

Many consumers conduct online or card-not-present (CNP) transactions at online merchants. At least some of these online merchants store payment card information, including payment card numbers, for their returning customers, to process returns, and for purchase trend research. This payment card information may include other cardholder identifying information. In many cases, this information is stored for processing recurring transactions or to improve the speed of the checkout process for future online transactions. The stored payment card information allows a customer to avoid having to re-enter his or her payment card information every time the customer makes an online purchase from the merchant. However, this payment card information is susceptible to a data breach, which may result in the data being stolen. Over the past several years, many cases of security breaches, also known as account data compromises, have been reported. While some breaches have been for a few payment cards, other breaches have affected millions of payment cards. The stolen payment card information may then be used to perform fraudulent transactions.

Additionally, card-present transactions can lead to compromised payment cards at merchant locations and ATMs. The compromised payment cards can then be used for future fraudulent transactions at other locations. For example, an employee of a merchant where a card is used steals card information and uses that stolen card information to perform fraudulent transactions. Additionally, while the compromise may only occur at "Merchant A," the subsequent fraudulent transactions may be transacted with multiple different merchants. Determining the source of the breaches can be difficult.

At least some known systems for fraud detection rely on cardholder reports of fraud. However, in at least some cases, these fraud reports and subsequent investigations can take weeks or months to resolve, leaving other account data compromised from that same merchant vulnerable to continued compromise and/or fraudulent use.

BRIEF DESCRIPTION

In one aspect, a compromise detection computing device including a processor in communication with a memory is provided. The processor is programmed to receive transaction data associated with a set of transactions performed at a plurality of merchants, each transaction of the set of transactions conducted using one of a plurality of payment devices, and identify a first merchant of the plurality of merchants. The processor is also programmed to generate a list of every payment device of the plurality of payment devices that was used to conduct one or more transactions of the set of transactions at the first merchant, monitor subsequent transaction activity associated with each payment device on the generated list, and generate a fraud proxy score for each payment device on the generated list based upon the subsequent transaction activity. The processor is further programmed to access one or more fraud report records associated with any payment device on the generated list, and generate a first implication score for the first merchant based upon the generated fraud proxy score and the one or more fraud report records. The processor is still further programmed to, when the first implication score meets a first criteria indicating potential compromise of the first merchant, automatically transmit an alert message to at least one receiving party, the alert message notifying the receiving party of the potential compromise of the first merchant.

In another aspect, a method for identifying a source of data compromise is provided. The method is implemented using a compromise detection computing device including a processor in communication with a memory. The method includes receiving transaction data associated with a set of transactions performed at a plurality of merchants, each transaction of the set of transactions conducted using one of a plurality of payment devices, and identifying a first merchant of the plurality of merchants. The method further includes generating a list of every payment device of the plurality of payment devices that was used to conduct one or more transactions of the set of transactions at the first merchant, monitoring subsequent transaction activity associated with each payment device on the generated list, and generating a fraud proxy score for each payment device on the generated list based upon the subsequent transaction activity. The method also includes accessing one or more fraud report records associated with any payment device on the generated list, and generating a first implication score for the first merchant based upon the generated fraud proxy score and the one or more fraud report records. The method still further includes, when the first implication score meets a first criteria indicating potential compromise of the first merchant, automatically transmitting an alert message to at least one receiving party, the alert message notifying the receiving party of the potential compromise of the first merchant.

In a further aspect, a non-transitory computer-readable storage medium having computer-executable instructions thereon is provided. When executed by a compromise detection computing device, the computer-executable instructions cause the compromise detection computing device to receive transaction data associated with a set of transactions performed at a plurality of merchants, each transaction of the set of transactions conducted using one of a plurality of payment devices, and identify a first merchant of the plurality of merchants. The computer-executable instructions also cause the compromise detection computing device to generate a list of every payment device of the plurality of payment devices that was used to conduct one or more transactions of the set of transactions at the first merchant, monitor subsequent transaction activity associated with each payment device on the generated list, and generate a fraud proxy score for each payment device on the generated list based upon the subsequent transaction activity. The computer-executable instructions further cause the compromise detection computing device to access one or more fraud report records associated with any payment device on the generated list, and generate a first implication score for the first merchant based upon the generated fraud proxy score and the one or more fraud report records/The computer-executable instructions still further cause the compromise detection computing device to, when the first implication score meets a first criteria indicating potential compromise of the first merchant, automatically transmit an alert message to at least one receiving party, the alert message notifying the receiving party of the potential compromise of the first merchant.

BRIEF DESCRIPTION OF THE DRAWINGS

FIGS. 1-5 show example embodiments of the methods and systems described herein.

FIG. 1 is a block diagram of a data analytics system in accordance with one embodiment of the present disclosure.

FIG. 2 illustrates an example configuration of a client computing device used in the transaction processing system shown in FIG. 1.

FIG. 3 illustrates an example configuration of a server system used in the transaction processing system shown in FIG. 1.

FIG. 4 is a schematic block diagram of a compromise detection computing device that may be used with the data analytics system shown in FIG. 1.

FIG. 5 is a flowchart of one method for identifying a source of data compromise.

Figure 1:
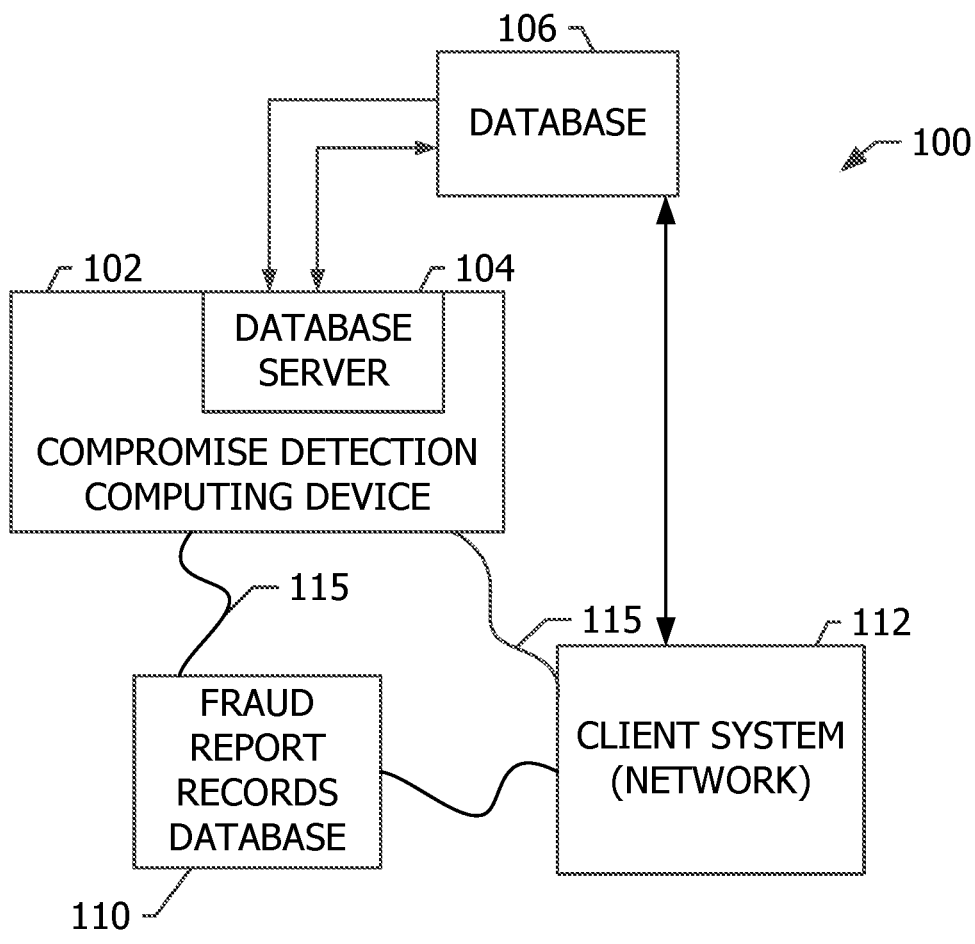

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION

Embodiments of the disclosure describe systems and methods for identifying a source of data compromise by tracking transaction activity of one or more devices after interacting with the source. More particularly, a data analytics system tracks subsequent transaction activity of a plurality of payment devices that have transacted with a merchant, for a predetermined period or interval of time (e.g., on a monthly basis). Based in part on the subsequent transaction activity, the data analytics system generates an "implication score" for the merchant, wherein the implication score represents a scaled likelihood that the merchant is a point of compromise of transaction data. In this way, the data analytics system may identify points of data compromise (e.g., compromised merchant systems) much faster than traditional systems that rely only on reports of fraud. In addition, by analyzing the transaction activity at a centralized location (e.g., a compromise detection computing device), the data analytics system provides compromise detection with a more expansive perspective than merchant-level fraud detection systems.

In some embodiments, the data analytics system uses the implication score to update or generate one or more fraud models. For example, in some embodiments, the data analytics system may include and/or be associated with a fraud scoring system or module. The fraud scoring module may receive transaction data, such as authorization request messages, during and/or after a transaction is conducted by a cardholder. The fraud scoring system may use a variety of fraud scoring models or algorithms to generate a fraud proxy score for the transaction. The fraud proxy score indicates a likelihood that the transaction is fraudulent. The fraud proxy score may be based on a comparison of data elements contained in the transaction data and historical cardholder transactions. In some embodiments of the present disclosure, the data analytics system causes the fraud scoring module to update one or more fraud scoring models with the implication score of the merchant. For example, when a merchant's implication score meets one or more criteria (e.g., exceeds a threshold), the merchant is flagged as potentially compromised. The data analytics system causes the fraud scoring module to update the fraud scoring models to indicate that the merchant is potentially compromised.

The data analytics system may automatically generate one or more alerts and transmit those alerts to one or more receiving parties (e.g., an issuer, an acquirer, the compromised merchants, cardholders that have transacted with the merchant). The alert notifies the receiving party of the potential compromise of the merchant. In some embodiments, the alert causes the receiving party, such as an issuer or an acquirer, to (i) block future transactions conducted at the merchant until any security issues at the merchant have been resolved, to prevent additional data compromise, (ii) impose additional authentication procedures on transactions conducted by payment devices that have previously transacted with the merchant, and/or (iii) notify one or more cardholders that have transacted with the merchant of the data compromise. In some cases, one or more transactions (or, in some cases, all of the transactions) conducted at the merchant may be flagged, indicating (i) the transaction is potentially fraudulent, and/or (ii) account data associated with that transaction is potentially compromised. When potentially fraudulent transactions are blocked, the data analytics system facilitates reducing (i) network traffic, and (ii) subsequent time and processing requirements for investigating and handling fraudulent transactions and fraud reports.

As described above, although online and other card-not-present (CNP) transactions are increasing in number, such transactions may be vulnerable to data compromise. In some cases, cardholders may transact with illicit merchants, such as merchants that either (i) sell goods or services and fraudulently collect and share cardholder personal and/or payment information, or (ii) fraudulently collect and share cardholder personal and/or payment information without providing goods or services. In other cases, online merchants conducting real businesses may be "hacked" or otherwise unknowingly become compromised, such that cardholder personal and/or payment information shared with the merchant may be fraudulent collected and shared or otherwise illicitly used (e.g., to make other fraudulent purchases).

At least some online and/or CNP transactions are processed using a transaction processing network, such as the MASTERCARD® or VISA® network. In the example embodiment, the transaction processing network includes one or more computing devices that process and/or store transaction data associated with each transaction conducted over that network. Transaction data may include, for example, a transaction amount; a merchant identifier; an account identifier of a payment account and/or a device identifier of a payment device (e.g., credit card, smart phone, etc.) used to initiate the transaction (associating the transaction with the cardholder); a time and date stamp; and a location identifier, which may identify where the transaction was initiated, a location of the cardholder at the time the transaction was initiated, and/or the location of the merchant (e.g., a merchant computing device such as a point-of-sale device). It should be understood that this transaction data may be stored in an encrypted, anonymized, and/or aggregated format.

In the example embodiment, the data analytics system accesses the stored transaction data and uses the transaction data to identify or isolate one or more merchants (e.g., using a merchant identifier) to monitor for data compromise or fraud. In some embodiments, a merchant may be identified or selected for compromise/fraud monitoring based on a transaction volume, a nation of origin of the merchant, and/or a threshold number of transactions. Additionally or alternatively, a merchant may be identified or selected for compromise/fraud monitoring randomly, or according to an ordered (e.g., alphabetical or numerical) list. In some embodiments, a merchant may be identified or selected for fraud based on other factors.

Once a merchant is identified, the data analytics system identifies all of the payment devices and/or payment accounts used to transact at that merchant. In addition, the data analytics system generates a list of those payment device/account identifiers. As used herein, "list" may include a single-column array, a multi-column array (e.g., a table), and/or any other format or structure of data. In some embodiments, the data analytics system generates the list of the payment device/account identifiers used to conduct transactions at the merchant within a predetermined interval of time, such as within a month or a year (before and/or after) of a certain date.

The data analytics system subsequently tracks payment and transaction activity for the payment devices and/or payment accounts on the generated list for another predetermined period of time. This subsequent period of time may be a period of weeks or months after a certain date or may be a "rolling" interval of time. In other words, the data analytics system may retrieve a six-month, twelve-month, eighteen-month, etc., batch of transaction data associated with the transaction activity of the payment devices and/or payment accounts on the generated list at once, or the data analytics system may actively monitor or retrieve the transaction activity on a rolling basis (e.g., every week) within a period of time (e.g., eighteen months). The predetermined period of time may be determined based upon a number of factors, such as the particular merchant identified, the number of payment devices/accounts on the generated list, a default period of time, a data storage and/or processing capacity, and/or any other factor(s).

The data analytics system analyzes the subsequent transaction activity to identify any potential fraud associated with payment devices and/or payment accounts (e.g., fraudulent use and/or other signs of account compromise). In some embodiments, the data analytics system utilizes one or more fraud models that apply various rules to identify accounts that may be compromised. The fraud models may flag potentially compromised accounts, such that those accounts are investigated further, are blocked from future transactions to avoid fraudulent use, and/or have additional authentication measures (e.g., two-step authentication, password entry, biometric authentication, etc.) imposed thereon. The fraud models may additionally or alternatively output fraud proxy scores or metrics characterizing the subsequent transaction activity of any payment account/device, the fraud proxy scores representing a scaled likelihood that transaction activity associated with that payment device/account is fraudulent.

In some embodiments, the data analytics system also generates an inverse recommender score from the subsequent transaction activity, for one or more transactions within the subsequent transaction activity, or for one or more payment accounts/devices. The inverse recommender score is an indicator of a likelihood of a fraudulent transaction. The inverse recommender score infers a cardholder's preferences for a merchant based on merchants frequented by the cardholder. The data analytics system derives an "importance" of a merchant based on how they are connected in a correspondence matrix, e.g., by the number of cardholder co-visits between the merchants. Thus, when a cardholder makes a purchase at a new merchant (e.g., a merchant where the cardholder has not previously transacted), the data analytics system generates an inverse recommender score for that transaction. This score can be thought of as a score that reflects a likelihood that this merchant is a merchant where the cardholder would not likely perform a transaction, or a measure of the likelihood that a transaction with that merchant is fraudulent (e.g., if the cardholder is very unlikely to transact there). Calculation of an inverse recommender score is described in co-pending U.S. patent application Ser. No. 15/794,768, filed Oct. 26, 2017, entitled "SYSTEMS AND METHODS FOR DETECTING OUT-OF-PATTERN TRANSACTIONS", the disclosure of which is hereby incorporated herein by reference in its entirety.

The data analytics system also leverages reports of actual fraud from any of the payment devices/accounts on the generated list. When a cardholder identifies a potentially fraudulent transaction (e.g., an unauthorized purchase using their payment card), the cardholder reports that potentially fraudulent transaction to an issuer of their payment account/card/device. These reports may be referred to as "fraud reports", and records of the fraud reports ("fraud report records") may be stored at a fraud report record database. The fraud report records may include various data identifying the potentially fraudulent transaction activity, such as any transaction data associated with a potentially fraudulent transaction, a narrative provided by the cardholder (or other reporting entity), time or date data associated with the actual report of the fraud, and/or additional or alternative data. Fraud reports may also be generated by issuers, acquirers, and/or merchants, as any of these entities may employ their own fraud modelling and/or fraud identification processes to identify fraudulent transaction activity. In some cases, reported or "actual" fraud may be the best or most accurate indicator of whether a particular payment account, device, or card is compromised. However, as noted above, there may be a period of time that passes between the occurrence of the fraudulent activity, the subsequent fraud record, and/or any follow-up investigations that may identify a source of the data compromise (e.g., a common point of compromise for many compromised accounts).

Accordingly, by leveraging both reported fraud and fraud proxy scores that represent likely and/or potential fraud, the data analytics system described herein may facilitate more prompt identification of a source of data compromise of many payment accounts/devices. More specifically, the data analytics system uses the fraud proxy scores and the fraud report records to generate an implication score for the identified merchant. The data analytics system derives one or more sets of variables associated with fraud report records and/or fraud proxy scores. Variables may include, for example, transaction amounts, transaction velocities, fraud proxy score trends, fraud proxy score thresholds (e.g., a particular number of subsequent transactions with a score higher than a threshold value), ratios of short-term to long-term behavior, and/or other variables, especially variables that feature exponential decay with short- and medium-term aging parameters (e.g., 30 days, 90s days). These variables are used to identify changes between short-term and long-term behavior that may be indicative of fraudulent use and, therefore, data compromise with the merchant as a common source of compromise. The implication score represents a quantitative analysis of these variables output as a score. In some embodiments, the data analytics system may not use fraud report records to derive variables and/or generate the implication score. In some embodiments, the data analytics system also uses inverse recommender score(s) for transactions conducted at a merchant to generate the implication score for the merchant. The implication score is a numeric indicator (or any other type of indicator) of the relative (e.g., normalized or otherwise scaled) likelihood that the merchant is compromised and may represent a source of compromise of one or more payment accounts/devices on the generated list.

In the example embodiment, when the implication score for a merchant meets a first criteria indicating potential compromise of that merchant (e.g., exceeds a threshold or does not meet a threshold, depending on the scoring scale), the data analytics system automatically generates an alert message identifying the potentially compromised merchant. The data analytics system transmits the alert message to at least one receiving party (e.g., an issuer, an acquirer, the compromised merchants, cardholders that have transacted with the merchant). The alert message notifies the receiving party of the potential compromise of the merchant. In some embodiments, the alert message includes instruction causing the receiving party to activate (e.g., activate a computing device associated with the receiving party) and (i) block future transactions conducted at the merchant (e.g. until any security issues at the merchant have been resolved), (ii) impose additional authentication procedures on future transactions conducted by payment devices that have previously transacted with the merchant, and/or (iii) notify one or more cardholders that have transacted with the merchant of the data compromise. In some cases, one or more transactions (or, in some cases, all of the transactions) conducted at the merchant may be flagged, indicating (i) the transaction is potentially fraudulent, and/or (ii) account data associated with that transaction is potentially compromised. In some cases, the receiving party is an issuer of payment devices/accounts, at least one of which has transacted at the compromised merchant. The information in the alert message may cause the issuer to block future transactions conducted at the merchant and/or to contact any cardholders that have already transacted at the merchant. In other cases, the receiving party is an acquirer associated with the compromised merchant. The acquirer may notify the merchant of the data compromise and/or may block future transactions conducted at the merchant until the merchant has taken steps to rectify any security issues (such that the acquirer is not liable for any chargebacks, for example).

In some embodiments, the data analytics system may initiate an investigation into the merchant as a source of compromise of data associated with one or more payment devices on the generated list. In some implementations, the data analytics system may include one or more components configured to conduct the investigation automatically. In other implementations, the alert message generated by the data analytics system and transmitted to the receiving party (e.g., an issuer, an acquirer, the merchant, or another third party such as an investigatory party) includes instructions causing the receiving party to initiate and/or conduct the investigation into the merchant.

In some embodiments, the data analytics system incorporates the generated implication score into one or more fraud models used to identify fraudulent transactions and/or compromised payment accounts/devices. Accordingly, the fraud models, incorporating the generated implication scores, may score transactions at certain merchants (e.g., merchants that were implicated as likely compromised by the implication score) as more likely fraudulent and/or may cause one or more entities of a transaction processing system to block transactions at those merchants. In some embodiments, incorporating the implication score into the fraud models may facilitate identifying additional fraudulent transactions conducted at other (non-compromised) merchants using compromise payment accounts/devices. In other words, the data analytics system develops or builds enhanced fraud models that can prevent further data compromise and/or more accurately identify past fraudulent transactions.

The methods and systems described herein may be implemented using computer programming or engineering techniques including computer software, firmware, hardware, or any combination or subset therefor. At least one of the technical problems addressed by this system includes: (i) reactive response to reported fraud; and (ii) network bandwidth and processing capabilities tied up in processing fraudulent transactions and/or transactions that may leave account data vulnerable.

The technical effect of the systems and methods described herein is achieved by performing at least one of the following steps: (a) receiving transaction data associated with a set of transactions performed at a plurality of merchants, each transaction of the set of transactions conducted using one of a plurality of payment devices; (b) identifying a first merchant of the plurality of merchants; (c) generating a list of every payment device of the plurality of payment devices that was used to conduct one or more transactions of the set of transactions at the first merchant; (d) monitoring subsequent transaction activity associated with each payment device on the generated list; (e) generating a fraud proxy score for each payment device on the generated list based upon the subsequent transaction activity; (f) accessing one or more fraud report records associated with any payment device on the generated list; (g) generating a first implication score for the first merchant based upon the generated fraud proxy score and the one or more fraud report records; and (h) when the first implication score meets a first criteria indicating potential compromise of the first merchant, automatically transmitting an alert message to at least one receiving party, the alert message notifying the receiving party of the potential compromise of the first merchant.

The resulting technical effect achieved by the systems and methods described herein is at least one of: (i) proactive approach to fraud response and prevention by identifying sources of data compromise; (ii) freeing up network bandwidth and processing capabilities by blocking and/or reducing the number of fraudulent transactions processed and/or transactions processed at sources of data compromise; (iii) improved data security measures; (iv) faster response to data compromise at merchant sources; and (v) improved fraud models including iterative approach identifying potentially compromised merchants.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example data analytics system 100 including a plurality of computer devices for identifying sources of data compromise. In the example embodiment, the plurality of computer devices includes, for example, a compromise detection computing device 102 and client systems 112 (e.g., a network client system such as a payment processor associated with a transaction processing network).

More specifically, in the example embodiment, network client system 112 is communicatively coupled to compromise detection computing device 102. Compromise detection computing device 102 is configured to leverage one or more fraud models of transaction activity as well as known fraud report records to generate an implication score for at least one merchant, the implication score indicating a relative likelihood that a merchant is a source of data compromise. In one particular embodiment, compromise detection computing device 102 is configured to receive transaction data associated with a set of transactions performed at a plurality of merchants, each transaction of the set of transactions conducted using one of a plurality of payment devices. In some cases, compromise detection computing device 102 receives the transaction data from network client system 112. In other cases, network client system 112 stores transaction data in a database 106, and compromise detection computing device 102 retrieves the transaction data therefrom. Compromise detection computing device 102 is further configured to identify a first merchant of the plurality of merchants, and generate a list of every payment device of the plurality of payment devices that was used to conduct one or more transactions of the set of transactions at the first merchant. In other words, compromise detection computing device 102 identifies and lists all payment devices that have transacted with that first merchant. In addition, compromise detection computing device 102 is configured to monitor subsequent transaction activity associated with each payment device on the generated list, and generate a fraud proxy score (also referred to herein as a "fraud proxy score") for each payment device on the generated list based upon the subsequent transaction activity. Compromise detection computing device 102 may use one or more fraud models to generate the fraud proxy score for each payment device. The fraud models generate the fraud proxy score, which is an indication of a relative likelihood that the payment device is used in a fraudulent transaction.

Compromise detection computing device 102 also accesses one or more reported fraud report records (e.g., stored at fraud report records database 110) associated with any payment device on the generated list. Based upon the generated fraud proxy score and any retrieved fraud report records associated with fraudulent transactions conducted using any payment device on the generated list, compromise detection computing device 102 generates an implication score for the merchant. In the example embodiment, when the implication score meets a first criteria indicating potential compromise of the merchant, compromise detection computing device 102 automatically initiates an investigation into the merchant as a source of compromise of data associated with one or more payment devices on the generated list.

In one embodiment, network client system 112 includes any suitable computer system such that compromise detection computing device 102 is accessible to network client system 112 using the Internet. Network client system 112 and compromise detection computing device 102 are interconnected to the Internet through many interfaces including a network 115, such as a local area network (LAN) or a wide area network (WAN), dial-in-connections, cable modems, and special high-speed Integrated Services Digital Network (ISDN) lines. Network client system 112 could be any device capable of interconnecting to the Internet including a web-based phone ("smartphone"), PDA, personal (laptop or desktop) computer, wearable computing device (e.g., "smart glasses" or a "smart watch"), or other web-based connectable equipment. In some embodiments, network client system 112 may be a payment processor. In the example embodiment, network client system 112 is associated with a financial transaction processing network, and may be referred to as an interchange computer system. Network client system 112 may be used for processing transaction data and/or for storing or accessing already processed transaction data. In the example embodiment, the transaction data is transmitted in an ISO® 8583 compliant data message. As used herein, "ISO®" refers to a series of standards approved by the International Organization for Standardization. (ISO is a registered trademark of the International Organization for Standardization of Geneva, Switzerland.) ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations or data fields for storing Private Data Elements. Network client system 112 may additionally and/or alternatively include one or more other computing devices associated with a payment processing network.

A database server 104 is connected to database 106, which contains information on a variety of matters, as described below in greater detail. In one embodiment, centralized database 106 is stored on compromise detection computing device 102 and can be accessed by potential users at network client system 112 by logging onto compromise detection computing device 102 through network client system 112. In an alternative embodiment, database 106 is stored remotely from compromise detection computing device 102 and may be non-centralized.

Database 106 may include a single database having separated sections or partitions or may include multiple databases, each being separate from each other. Database 106 may store transaction data generated as part of sales activities conducted over a transaction processing network (e.g., network client system 112) including data relating to merchants, account holders or customers, issuers, acquirers, and/or purchases made.

In a typical transaction processing system, a financial institution called the "issuer" issues a transaction card, such as a credit card, to a consumer or cardholder, who uses the transaction card to tender payment for a purchase from a merchant. To accept payment with the transaction card, the merchant must normally establish an account with a financial institution that is part of the financial payment system. This financial institution is usually called the "merchant bank," the "acquiring bank," or the "acquirer." When the cardholder tenders payment for a purchase with a transaction card, the merchant requests authorization from a merchant bank for the amount of the purchase, for example, by receiving account information associated with the cardholder and communicating the account information to the merchant bank. Using a payment processor (e.g., network client system 112), the merchant will communicate with the issuer bank to determine whether the cardholder's account is in good standing and whether the purchase is covered by the cardholder's available credit line. Based on these determinations, the request for authorization will be declined or accepted. If a request for authorization is accepted, the available credit line of the cardholder's account is decreased. If the cardholder uses a debit card, the available funds in the cardholder's account will be decreased. The payment processor may store the transaction card information, such as a type of merchant, amount of purchase, date of purchase, in database 106.

After a purchase has been made, a clearing process occurs to transfer additional transaction data related to the purchase among the parties to the transaction. More specifically, during and/or after the clearing process, additional data, such as a time of purchase, a merchant name, a type of merchant, purchase information, account-holder account information, a type of transaction, savings information, information regarding the purchased item and/or service, and/or other suitable information, is associated with a transaction and transmitted between parties to the transaction as transaction data. The payment processor may store the transaction data in database 106. As described herein, transaction data includes such elements as a transaction amount; a merchant identifier; an account identifier (associating the transaction with the cardholder); a time and date stamp; and a location identifier, which may identify where the transaction was initiated, a location of the cardholder at the time the transaction was initiated, and/or the location of the merchant (e.g., a merchant computing device such as a point-of-sale device). In some embodiments, transaction data may be stored in database 106 in an aggregated and/or anonymized format, such that no personally identifiable information is stored therein.

Database 106 may also store account data including at least one of a cardholder name, a cardholder address, a primary account number (PAN) associated with the cardholder name, other account identifier(s), and/or device identifier(s) of user computing devices used by the cardholder. Database 106 may also store merchant data including a merchant identifier that identifies each merchant registered to use the network, and instructions for settling transactions including merchant bank account information. Database 106 may also store purchase data associated with items being purchased by a cardholder from a merchant, and authorization request data.

Data analytics system 100 further includes a fraud report records database 110. Fraud report records database 110 may be associated with and/or in communication with network client system 112. Fraud report records database 110 includes a data repository for reports of fraud, reported by cardholders, merchants, and/or acquirers. Each report of fraud may include a plurality of data elements, such as a report date, a transaction date (of a transaction that was eventually reported as fraudulent), an account identifier and/or payment device identifier (e.g., credit card number) of the account and/or payment device used to conduct the fraudulent transaction (i.e., a "compromised" account identifier and/or payment device identifier), a merchant identifier, a payment/fraud amount, and/or any other data elements. Fraud report records database 110 may further include reports of investigations initiated in repose to recorded fraud reports, including outcome(s) of those investigations, identified fraudulent entities (e.g., cardholders or merchants involved in fraudulent transaction activities), and/or any other information related to reported fraud.

Figure 2:
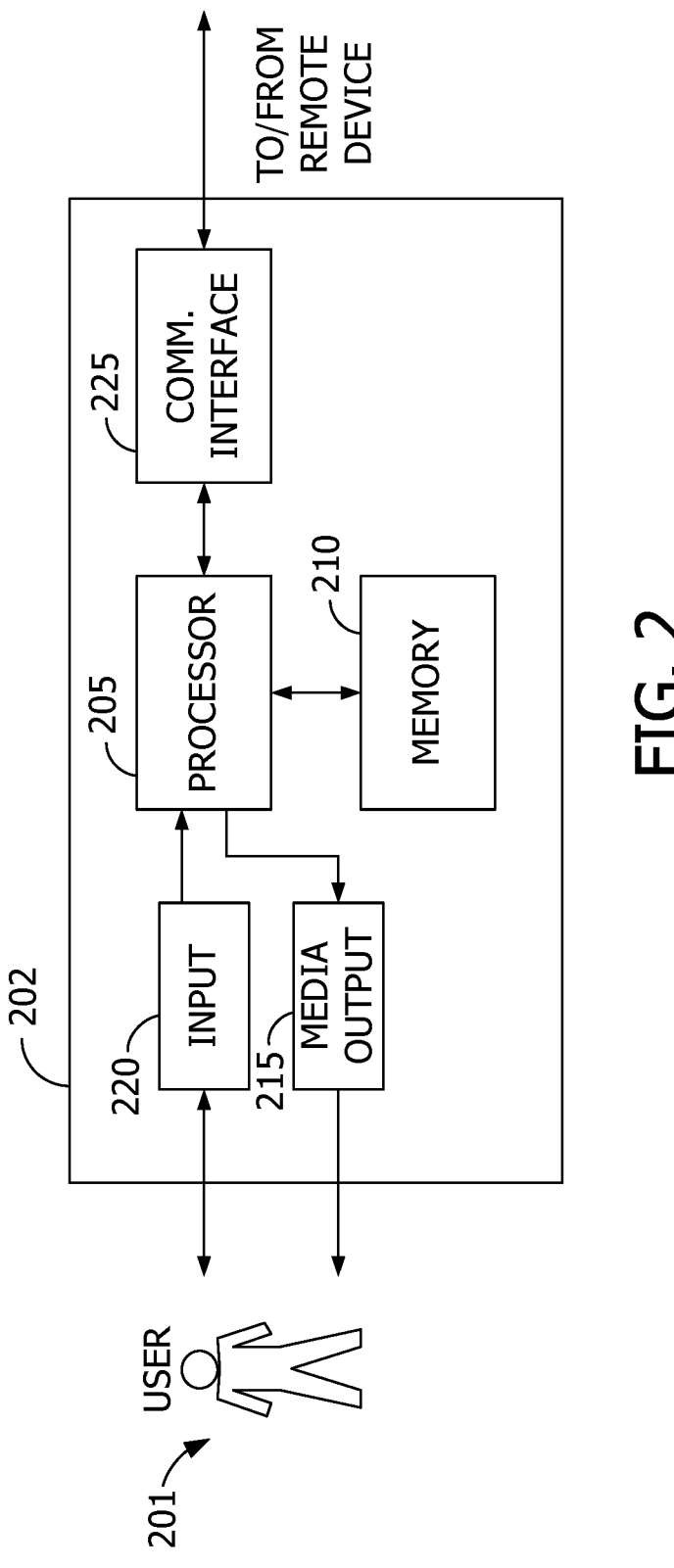

FIG. 2 illustrates an example configuration of a client computing device 202. Client computing device 202 may include, but is not limited to, network client system 112 shown in FIG. 1. Client computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

Client computing device 202 also includes at least one media output component 215 for presenting information to a user 201. Media output component 215 is any component capable of conveying information to user 201. In some embodiments, media output component 215 includes an output adapter such as a video adapter and/or an audio adapter. An output adapter is operatively coupled to processor 205 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 202 includes an input device 220 for receiving input from user 201. Input device 220 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 215 and input device 220.

Client computing device 202 may also include a communication interface 225, which is communicatively coupleable to a remote device such as a compromise detection computing device 102, fraud report records database 110 (both shown in FIG. 1) or a web server operated by a merchant. Communication interface 212 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer-readable instructions for providing a user interface to user 201 via media output component 215 and, optionally, receiving and processing input from input device 220. A user interface may include, among other possibilities, a web browser and client application. Web browsers enable users 201 to display and interact with media and other information typically embedded on a web page or a website from a web server associated with a merchant. A client application allows users 201 to interact with a server application associated with, for example, an online merchant.

Figure 3:
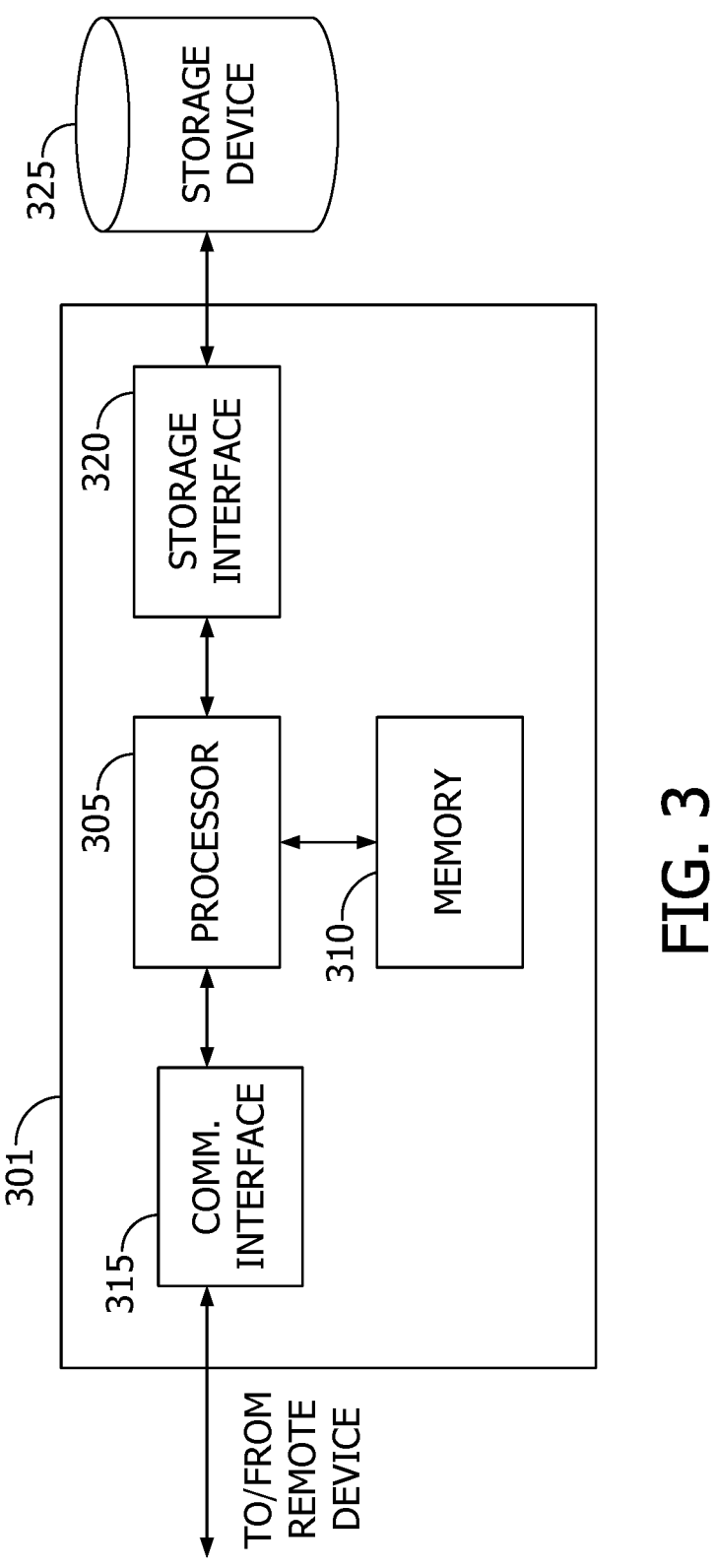

FIG. 3 illustrates an example configuration of a server computing device 301. Server computing device 301 may include, but is not limited to, compromise detection computing device 102, database server 104, and/or network client systems 112 (all shown in FIG. 1). Server computing device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computing device 3012 is capable of communicating with a remote device such as client computing device 202 or another server computing device 301. For example, communication interface 315 may receive requests for communication via the Internet, as illustrated in FIG. 1.

Processor 305 may also be operatively coupled to a storage device 325. Storage device 325 is any computer-operated hardware suitable for storing and/or retrieving data. In some embodiments, storage device 325 is integrated in server computing device 301. For example, server computing device 301 may include one or more hard disk drives as storage device 325. In other embodiments, storage device 325 is external to server computing device 301 and may be accessed by a plurality of server computing devices 301. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 325 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Memory areas 310 and 210 (shown in FIG. 2) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
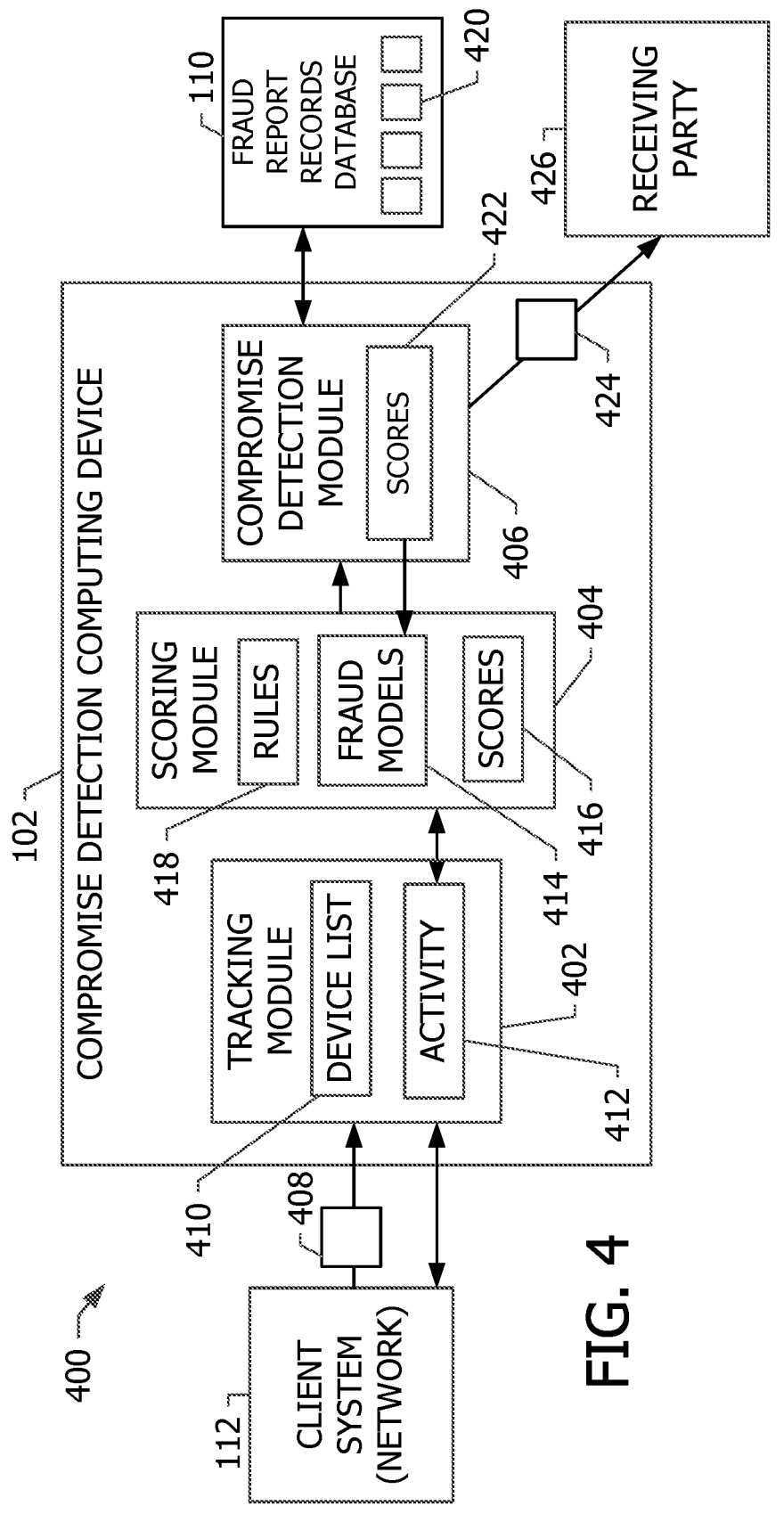

FIG. 4 is a schematic block diagram of compromise detection computing device 102 that may be used with data analytics system 100 (both shown in FIG. 1). In the illustrated embodiment, compromise detection computing device 102 includes a plurality of modules. These modules may include specific computer-executable instructions that specifically program a processor of compromise detection computing device 102 (e.g., processor 205 or 305, shown in FIGS. 2 and 3, respectively) to perform the functions described herein. Alternatively, the modules may include a plurality of separate processing devices configured to individually perform the functions described herein.

In particular, compromise detection computing device 102 includes a tracking module 402, a scoring module 404, and a compromise detection module 406. Compromise detection computing device 102 executes tracking module 402 to, initially, receive transaction data 408 associated with a set of transactions performed at a plurality of merchants, each transaction of the set of transactions conducted using one of a plurality of payment devices. In the example embodiment, compromise detection computing device 102 receives transaction data 408 from network client system 112 (also shown in FIG. 1). As used herein, "receive" may include active retrieving or accessing and/or passive receiving and should be construed to be limited to passive receiving. Transaction data 408 is associated with the set of transactions conducted over a transaction processing network, such as network client system 112. Transaction data 408 may include, for example, a transaction amount; a merchant identifier; an account identifier of a payment account and/or a device identifier of a payment device (e.g., credit card, smart phone, etc.) used to initiate the transaction (associating the transaction with the cardholder); a time and date stamp; and a location identifier, which may identify where the transaction was initiated, a location of the cardholder at the time the transaction was initiated, and/or the location of the merchant (e.g., a merchant computing device such as a point-of-sale device).

Compromise detection computing device 102 executes tracking module 402 to parse received transaction data 408 to identify a first merchant of the plurality of merchants to monitor for data compromise or fraud. In some embodiments, tracking module 402 may identify a merchant for compromise/fraud monitoring based on a transaction volume, a nation of origin of the merchant, and/or a threshold number of transactions.

Once the first merchant is identified, compromise detection computing device 102 executes tracking module 402 to parse received transaction data 408 to identify all of the payment devices and/or payment accounts used to transact at the first merchant. In addition, tracking module 402 generates a list 410 of those payment devices/accounts. As used herein, list 410 may include a single-column array, a multi-column array (e.g., a table), and/or any other format or structure of data. In some embodiments, tracking module 402 generates list 410 of the payment device/account identifiers used to conduct transactions at the merchant within a predetermined interval of time, such as within a month (before and/or after) of a certain date.

Tracking module 402 subsequently tracks payment and transaction activity 412 for the payment devices and/or payment accounts on list 410 for another predetermined period of time. This subsequent period of time may be a period of weeks or months after a certain date or may be a "rolling" interval of time. Tracking module 402 may receive and/or store additional transaction data 408 and/or simplified or parsed records thereof as monitored transaction activity 412. For example, in some cases, tracking module 402 may retrieve a six-month batch of transaction data 408 associated with the subsequent transaction activity of the payment devices and/or payment accounts on list 410 at once to track and record as monitored transaction activity 412. In other cases, tracking module 402 may actively retrieve transaction data 408 to track and record as monitored transaction activity 412 on a rolling basis (e.g., every week) within a period of time (e.g., six months). The predetermined period of time may be determined based upon a number of factors, such as the particular merchant identified, the number of payment devices/accounts on list 410, a default period of time, and/or any other factors.

Compromise detection computing device 102 executes scoring module 404 to analyze monitored transaction activity 412 and identify any potential fraud associated with payment devices and/or payment accounts (e.g., fraudulent use and/or other signs of account compromise) on list 410. Scoring module 404 includes and implements one or more fraud models 414 that apply various rules 418 to identify accounts on list 410 that may be compromised. Scoring module 404 may use fraud models 414 to flag potentially compromised accounts, such that those accounts are investigated further and/or are blocked from future transactions to avoid fraudulent use. Fraud models 414 may additionally or alternatively generate a fraud proxy score 416 for each payment device on list 410, where fraud proxy scores 416 characterize monitored transaction activity 412 of any payment account/device on list 410. Fraud proxy scores 416 represent a scaled likelihood that transaction activity 412 associated with that payment device/account is fraudulent. In addition, fraud proxy scores 416 represent suspected fraud not accounted for in one or more fraud report records 420.

In some embodiments, scoring module 404 also generates an inverse recommender score from transaction activity 412, for one or more transactions within transaction activity 412, or for one or more payment accounts/devices on list 410.

The inverse recommender score is an indicator of a likelihood of a fraudulent transaction. Scoring module 404 infers a cardholder's preferences for a merchant based on merchants frequented by the cardholder and derives an "importance" of a merchant based on how they are connected in a correspondence matrix, e.g., by the number of cardholder co-visits between the merchants. Thus, when a cardholder makes a purchase at a new merchant (e.g., a merchant where the cardholder has not previously transacted), scoring module 404 generates an inverse recommender score for that transaction. This score can be thought of as a score that reflects a likelihood that this merchant is a merchant where the cardholder would not likely perform a transaction, or a measure of the likelihood that a transaction with that merchant is fraudulent (e.g., if the cardholder is very unlikely to transact there).

Compromise detection computing device 102 executes compromise detection module 406 to access one or more fraud report records 420 (e.g., from fraud report records database 110, shown in FIG. 1) associated with any payment device on list 410. Compromise detection module 406 leverages these fraud report records 420 from any of the payment devices/accounts on list 410 and fraud proxy scores 416 that represent likely and/or potential fraud to generate a first implication score 422 for the first merchant. In one embodiment, compromise detection module 406 derives one or more sets of variables associated with fraud report records 420 and/or fraud proxy scores 416. Variables may include, for example, transaction amounts, transaction velocities, fraud proxy score trends, fraud proxy score thresholds (e.g., a particular number of subsequent transactions with a score higher than a threshold value), ratios of short-term to long-term behavior, and/or other variables, especially variables that feature exponential decay with short- and medium-term aging parameters (e.g., 30 days, 90s days). These variables are used to identify changes between short-term and long-term behavior that may be indicative of fraudulent use and, therefore, data compromise with the merchant as a common source of compromise. Implication score 422 represents a quantitative analysis of these variables output as a score. In some embodiments, compromise detection module 406 may not use fraud report records 420 to derive variables and/or generate implication score 422.

Implication score 422 facilitates more prompt identification of a source of data compromise of many payment accounts/devices. In some embodiments, compromise detection module 406 also uses inverse recommender score(s) for transactions conducted at a merchant to generate implication score 422 for the merchant. Implication score 422 is a numeric indicator (or any other type of indicator) of the relative (e.g., normalized or otherwise scaled) likelihood that the merchant is compromised and may represent a source of compromise of one or more payment accounts/devices on list 410.

In the example embodiment, when implication score 422 for a merchant meets a first criteria indicating potential compromise of that merchant (e.g., exceeds a threshold or does not meet a threshold, depending on the scoring scale), compromise detection module 406 automatically generates an alert message 424 identifying the potentially compromised merchant. Compromise detection computing device 102 transmits alert message 424 to at least one receiving party 426 (e.g., an issuer, an acquirer, the compromised merchants, cardholders that have transacted with the merchant). Alert message 424 notifies receiving party 426 of the potential compromise of the merchant. In some embodiments, alert message 424 includes instruction causing receiving party 426 to activate (e.g., alert message 424 includes instructions to activate a computing device associated with receiving party 426) and (i) block future transactions conducted at the merchant (e.g. until any security issues at the merchant have been resolved), (ii) impose additional authentication procedures on future transactions conducted by payment devices that have previously transacted with the merchant, and/or (iii) notify one or more cardholders that have transacted with the merchant of the data compromise. In some cases, one or more transactions (or, in some cases, all of the transactions) conducted at the merchant may be flagged, indicating (i) the transaction is potentially fraudulent, and/or (ii) account data associated with that transaction is potentially compromised. In some cases, receiving party 426 is an issuer of payment devices/accounts, at least one of which has transacted at the compromised merchant. Alert message 424 may include instructions causing the issuer to block future transactions conducted at the merchant, to impose one or more authentication processes on future transaction conducted by the payment devices on list 410, and/or to contact any cardholders that have already transacted at the merchant. In other cases, receiving party 426 is an acquirer associated with the compromised merchant. The acquirer may notify the merchant of the data compromise and/or may block future transactions conducted at the merchant until the merchant has taken steps to rectify any security issues (such that the acquirer is not liable for any chargebacks, for example).

In some embodiments, compromise detection module 406 may initiate an investigation into the merchant as a source of compromise of data associated with one or more payment devices on list 410. For example, alert message 424 (or another message) includes instructions causing receiving party 426 (e.g., an issuer, an acquirer, the merchant, or another third party such as an investigatory party) to initiate and/or conduct the investigation into the merchant.

In some embodiments, the above-described process occurs over several iterations. For example, tracking module 402 tracks transaction activity 412 associated with each payment device on list 410 for one or more predetermined intervals of time. Subsequently, scoring module 404 generates an updated fraud proxy score 416 for each payment device on list 41 after each predetermined interval of time. Compromise detection module 406 may access any new fraud report records 420 associated with any payment device on list 410 after each predetermined interval of time. Compromise detection module 406 then updates implication score 422 for the first merchant based upon the generated fraud proxy scores 416 and the new fraud report records 420.

In some embodiments, compromise detection module 406 interfaces with scoring module 404 to incorporate implication score 422 into one or more fraud models 414. Accordingly, those fraud models 414, incorporating the generated implication scores 422, may score transactions at certain merchants (e.g., merchants that were implicated as likely compromised by the implication score) as more likely fraudulent and/or may cause one or more entities of a transaction processing system to block transactions at those merchants. Fraud models 414 may associate implications scores 422 with an updated fraud risk, indicating the potential compromise of the first merchant. In some embodiments, incorporating implication score 422 into fraud models 414 may facilitate identifying additional fraudulent transactions conducted at other (non-compromised) merchants using compromise payment accounts/devices. In other words, scoring module 404 develops or builds enhanced fraud models 414 that can prevent further data compromise and/or more accurately identify past fraudulent transactions.

FIG. 5 is a flowchart of one method 500 for identifying a source of data compromise. Method 500 may be implemented using data analytics system 100, more specifically, using compromise detection computing device 102 (both shown in FIG. 1).

Method 500 includes receiving 502 transaction data associated with a set of transactions performed at a plurality of merchants, each transaction of the set of transactions conducted using one of a plurality of payment devices. Method 500 also includes identifying 504 a first merchant of the plurality of merchants, and generating 506 a list of every payment device of the plurality of payment devices that was used to conduct one or more transactions of the set of transactions at the first merchant.

Method 500 further includes monitoring 508 subsequent transaction activity associated with each payment device on the generated list, and generating 510 a fraud proxy score for each payment device on the generated list based upon the subsequent transaction activity. Method 500 still further includes accessing 512 one or more fraud report records associated with any payment device on the generated list, and generating 514 a first implication score for the first merchant based upon the generated fraud proxy score and the one or more fraud report records. Method 500 includes, when the first implication score meets a first criteria indicating potential compromise of the first merchant, automatically transmitting 516 an alert message to at least one receiving party, the alert message notifying the receiving party of the potential compromise of the first merchant.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 204, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A compromise detection computing device comprising a processor in communication with (i) a memory, (ii) a payment interchange network, (iii) a fraud report records database, and (iv) at least one receiving computing device, the receiving computing device configured to transmit electronic data messages via the payment interchange network in response to a data message request, the processor programmed to:

execute a tracking module, a scoring module, and a compromise detection module, wherein the tracking module is in communication with the payment interchange network, and wherein the compromise detection module is in communication with the fraud report records database and the at least one receiving computing device;

record, using the tracking module, a plurality of electronic data messages submitted over the payment interchange network, each electronic data message of the plurality of electronic data messages having a data structure complying with a proprietary communication standard including i) a source identifier of a plurality of source identifiers wherein each source identifier identifies a data source, and ii) a device identifier of a plurality of device identifiers each associated with a respective payment device;

identify, using the tracking module, a first source identifier of the plurality of source identifiers that identifies a first data source;

generate, using the tracking module, a list of each device identifiers of the plurality of device identifiers that is associated with the first data source by one or more of the plurality of electronic data messages;

monitor, using the tracking module, subsequent electronic data messages transmitted over the payment interchange network complying with the proprietary communication standard, the subsequent electronic data messages including at least one device identifier on the generated list;

generate, using the scoring module, a proxy score for each device identifier on the generated list based upon the subsequent electronic data messages;

access, using the compromise detection module, one or more report records from the fraud report records database, the report records associated with any device identifier on the generated list;

generate, using the scoring module, a first implication score for the first data source based on the generated proxy score and the one or more report records, wherein the first implication score indicates a likelihood that the first data source is a source of data compromise;

when the first implication score exceeds a threshold indicating a likelihood of data compromise at the first data source, automatically transmit, using the compromise detection module, an alert message to the at least one receiving computing device, the alert message indicating the likelihood of compromise of the first data source associated with the first source identifier;

when the first implication score exceeds the threshold, transmit instructions to an additional computer-implemented resource separate from the compromise detection computing device that cause the additional computer-implemented resource to impose an additional authentication procedure to each request to submit a future electronic data message associated with the first source identifier submitted to the receiving computing device to validate the request to submit the future electronic data message prior to submitting the future electronic data message via the payment interchange network; and for each of the requests to submit a future electronic data message that fails the additional authentication procedure, transmit instructions to the at least one receiving computing device to block the future electronic data message from being transmitted over the payment interchange network thereby reducing a number of electronic data messages transmitted over the payment interchange network.

2. The compromise detection computing device of claim 1, wherein the processor is further configured to generate the first implication score based upon changes between short-term activity and long-term activity as derived from the generated proxy score and the one or more report records.

3. The compromise detection computing device of claim 1, wherein the alert message includes instructions configured to cause the receiving computing device to block future electronic data messages including the first source identifier from being transmitted through the payment interchange network.

4. The compromise detection computing device of claim 1, wherein the alert message includes instructions configured to cause the receiving computing device to block future electronic data messages associated with any of the device identifiers on the generated list.

5. The compromise detection computing device of claim 1, wherein the alert message includes instructions configured to cause the receiving computing device to transmit a notification to a user associated with each of the device identifiers on the generated list.

6. The compromise detection computing device of claim 1, wherein the processor is further configured to generate the proxy score of each device identifier using at least one fraud model.

7. The compromise detection computing device of claim 6, wherein the processor is further programmed to update the at least one fraud model to include an updated fraud risk associated with the likelihood of compromise of the first data source based at least in part upon the first implication score.

8. The compromise detection computing device of claim 1, wherein the processor is further programmed to:

monitor the subsequent electronic data messages associated with each device identifier on the generated list for one or more predetermined intervals of time;

generate an updated proxy score for each device identifier on the generated list after each one or more predetermined interval of time;

access any new report records associated with any device identifier on the generated list after each one or more predetermined interval of time; and update the first implication score for the first source identifier based upon the generated updated proxy score and the new report records.

9. The compromise detection computing device of claim 1, wherein the processor is further programmed to:

generate an inverse recommender score for one or more subsequent electronic data messages including one or more if the device identifiers on the generated list; and generate the first implication score further based upon the inverse recommender score.

10. A method for identifying a source of data compromise, the method implemented using a compromise detection computing device including a processor in communication with (i) a memory, (ii) a payment interchange network, (iii) a fraud report records database, and (iv) at least one receiving computing device, the receiving computing device configured to transmit electronic data messages via the payment interchange network in response to a data message request, the method including:

executing, by the processor, a tracking module, a scoring module, and a compromise detection module, wherein the tracking module is in communication with the payment interchange network, and wherein the compromise detection module is in communication with the fraud report records database and the at least one receiving computing device;

recording, by the processor using the tracking module, a plurality of electronic data messages submitted over the payment interchange network, each electronic data message of the plurality of electronic data messages having a structure complying with a proprietary communication standard including i) a source identifier of a plurality of source identifiers wherein each source identifier identifies a data source, and ii) a device identifier of a plurality of device identifiers each associated with a respective payment device;

identifying, by the processor using the tracking module, a first source identifier of the plurality of source identifiers that identifies a first data source;

generating, by the processor using the tracking module, a list of each device identifiers of the plurality of device identifiers that is associated with the first data source by one or more of the plurality of electronic data messages;

monitoring, by the processor using the tracking module, subsequent electronic data messages transmitted over the payment interchange network complying with the proprietary communication standard, the subsequent electronic data messages including at least one device identifier on the generated list;

generating, by the processor using the scoring module, a proxy score for each device identifier on the generated list based upon the subsequent electronic data messages;

accessing, by the processor using the compromise detection module, one or more report records from the fraud report records database, the report records associated with any device identifier on the generated list;

generating, by the processor using the scoring module, a first implication score for the first data source based on the generated proxy score and the one or more report records, wherein the first implication score indicates a likelihood that the first data source is a source of data compromise;

when the first implication score exceeding a threshold indicating a likelihood of data compromise at the first data source, automatically transmitting, by the processor using the compromise detection module, an alert message to the at least one receiving computing device, the alert message indicating the likelihood of data compromise of the first data source associated with the first source identifier;

when the first implication score exceeds the threshold, transmitting, by the processor, instructions to an additional computer-implemented resource separate from the compromise detection computing device that cause the additional computer-implemented resource to impose an additional authentication procedure to each request to submit a future electronic data message associated with the first source identifier submitted to the receiving computing device to validate the request to submit the future electronic data message prior to submitting the future electronic data message via the payment interchange network; and for each of the requests to submit a future electronic data message that fails the additional authentication procedure, transmitting, by the processor, instructions to the at least one receiving computing device to block the future electronic data message from being transmitted over the payment interchange network thereby reducing a number of electronic data messages transmitted over the payment interchange network.

11. The method of claim 10, further comprising generating, by the processor, the first implication score based upon changes between short-term activity and long-term activity as derived from the generated proxy score and the one or more report records.

12. The method of claim 10, further comprising generating, by the processor, the alert message to include instructions configured to cause the receiving computing device to block future electronic data messages including the first source identifier from being transmitted through the payment interchange network.

13. The method of claim 10, further comprising generating, by the processor, the alert message to include instructions configured to cause the receiving computing device to block future electronic data messages associated with any of the device identifiers on the generated list.

14. The method of claim 10, further comprising generating, by the processor, the alert message to include instructions configured to cause the receiving computing device to transmit a notification to a user associated with each of the device identifiers on the generated list.

15. The method of claim 10, further comprising generating, by the processor, the proxy score of each device identifier using at least one fraud model.

16. The method of claim 15, further comprising updating, by the processor, the at least one fraud model to include an updated fraud risk associated with the likelihood of compromise of the first data source based at least in part upon the first implication score.

17. The method of claim 10, further comprising:

monitoring, by the processor, the subsequent electronic data messages associated with each device identifier on the generated list for one or more predetermined intervals of time;

generating, by the processor, an updated proxy score for each device identifier on the generated list after each one or more predetermined interval of time;

accessing, by the processor, any new report records associated with any device identifier on the generated list after each one or more predetermined interval of time; and updating, by the processor, the first implication score for the first source identifier based upon the generated updated proxy score and the new report records.

18. A non-transitory computer-readable storage medium having computer-executable instructions thereon, wherein when executed by a compromise detection computing device including at least one processor in communication with (i) a payment interchange network, (ii) a fraud report records database, and (iii) at least one receiving computing device, the receiving computing device configured to transmit electronic data messages via the payment interchange network in response to a data message request, the computer-executable instructions cause the at least one processor to:

execute a tracking module, a scoring module, and a compromise detection module, wherein the tracking module is in communication with the payment interchange network, and wherein the compromise detection module is in communication with the fraud report records database and the at least one receiving computing device;

record, using the tracking module, a plurality of electronic data messages submitted over a computing network, each electronic data message of the plurality of electronic data messages having a data structure complying with a proprietary communication standard including i) a source identifier of a plurality of source identifiers wherein each source identifier identifies a data source, and ii) a device identifier of a plurality of device identifiers each associated with a respective payment device;

identify, using the tracking module a first source identifier of the plurality of source identifiers that identifies a first data source;

generate, using the tracking module, a list of each device identifiers of the plurality of device identifiers that is associated with the first data source by one or more of the plurality of electronic data messages;

monitor, using the tracking module, subsequent electronic data messages transmitted over the payment interchange network complying with the proprietary communication standard, the subsequent electronic data messages including at least one device identifier on the generated list;

generate, using the scoring module, a proxy score for each device identifier on the generated list based upon the subsequent electronic data messages;

access, using the compromise detection module, one or more report records from the fraud report records database, the report records associated with any device identifier on the generated list;

generate, using the scoring module, a first implication score for the first data source based on the generated proxy score and the one or more report records, wherein the first implication score indicates a likelihood that the first data source is a source of data compromise; and when the first implication score exceeding a threshold indicating a likelihood of data compromise at the first data source, automatically transmit, using the compromise detection module, an alert message to the at least one receiving computing device, the alert message indicating the likelihood of data compromise of the first data source associated with the first source identifier;

when the first implication score exceeds the threshold, transmit instructions to an additional, computer-implemented authentication resource separate from the compromise detection computing device that cause the additional computer-implemented resource to impose an additional authentication procedure to each request to submit a future electronic data message associated with the first source identifier submitted to the receiving computing device to validate the request to submit the future electronic data message prior to submitting the future electronic data message via the payment interchange network; and for each of the requests to submit a future electronic data message that fails the additional authentication procedure, transmit instructions to the at least one receiving computing device to block the future electronic data message from being transmitted over the payment interchange network thereby reducing a number of electronic data messages transmitted over the payment interchange network.

19. The compromise detection computing device of claim 1, wherein the additional authentication procedure includes at least one of two-step authentication, password entry, or biometric authentication.

20. The compromise detection computing device of claim 1, further comprising the tracking module, the scoring module, and the compromise detection module.

\* \* \* \* \*